United States Patent [19]

Tamura et al.

[11] Patent Number: 5,705,457
[45] Date of Patent: Jan. 6, 1998

[54] OXIDE SUPERCONDUCTOR AND METHOD FOR MANUFACTURING THE SAME

[75] Inventors: Toshiyuki Tamura, Kanagawa-ken; Seiji Adachi, Saitama-ken; Xiao-Jing Wu, Chiba-ken; Hisao Yamauchi, Yokohama, all of Japan

[73] Assignees: The Furukawa Electric Co., Ltd., Tokyo; Matsushita Electric Industrial Co., Ltd., Osaka; International Superconductivity Technology Center, Tokyo, all of Japan

[21] Appl. No.: 525,912

[22] Filed: Sep. 8, 1995

[30] Foreign Application Priority Data

Sep. 13, 1994 [JP] Japan ............................ 6-219250

[51] Int. Cl.$^6$ ............................ H01L 39/24; H01L 39/12; C04B 35/45
[52] U.S. Cl. .................... 505/482; 505/125; 505/126; 505/500; 505/742; 505/776; 252/521
[58] Field of Search ........................ 505/125, 126, 505/500, 482, 742, 776; 252/521

[56] References Cited

U.S. PATENT DOCUMENTS

| | | | |
|---|---|---|---|
| 5,190,914 | 3/1993 | Koriyama et al. | 505/125 |
| 5,318,949 | 6/1994 | Harrison et al. | 505/125 |
| 5,372,990 | 12/1994 | Nobumasa et al. | 505/125 |
| 5,389,603 | 2/1995 | Batlogg et al. | 505/500 X |
| 5,444,039 | 8/1995 | Isawa et al. | 505/500 X |
| 5,446,017 | 8/1995 | Sakurai et al. | 505/125 |
| 5,472,527 | 12/1995 | Otto et al. | 505/500 X |
| 5,502,029 | 3/1996 | Doi et al. | 505/125 X |

FOREIGN PATENT DOCUMENTS

| | | |
|---|---|---|
| 7053212 | 2/1995 | Japan . |
| 92/05114 | 4/1992 | WIPO . |

OTHER PUBLICATIONS

Nobumasa, H., et al., "Correlation between the Superconducting Transition Temperature and the spacing of Cu–O2 Sheets in the Copper–Oxide Superconductors", Physica C, 167, 515–519, May 1990.

Superconductor & Science & Technology, vol. 7, No. 6, Jun., 1994 pp. 407–411, H. Hecht et al, "Common Features of (Pb, Sr) And (Pb, Ca) 1212 Superconductors Produced On 02 At Normal Pressure".

Tamura, Toshiyuki, et al., "115K superconductivity in the Pb–Sr–Ca–Cu–O system and formation of a new homologous series consisting of Pb–based layered cuprates", Physica C, 249(1&2), 111–116, Jul. 1995.

Yamauchi, Hisao, et al., "A Missing Link is Found: A Novel Homologous Series of Superconducting Pb–based Cuprates", Jpn. J. Appl. Phys., 34 (Part 2, No. 3B), L349–L351, Mar. 1995.

Beales, T.P., et al., "Synthesis and properties of a series of layered copper oxide superconductors with a (Pb0.5Cd0.5) rock–salt dopant layer", Physica C, 205(3&4), 383–396, Feb. 1993.

Primary Examiner—Douglas J. McGinty
Attorney, Agent, or Firm—Frishauf, Holtz, Goodman, Langer & Chick, P.C.

[57] ABSTRACT

The present invention provides an oxide superconductor which is expressed in the composition formula $(Pb_{1-x-y}M_x(A1)_y)(A2)_2(A3)_{n-1}(Cu)_n(O)_{2n+3+z}$ (wherein $0 \leq x \leq 0.6$, $0 \leq y \leq 0.6$, $x+y \leq 0.6$, n denotes integers of 1 or more, $-0.6 \leq z \leq 0.5$, M denotes Cu or Cd, and A1, A2 and A3 denote at least one element of Ba, Sr, and Ca, respectively) and which has a crystal structure stacking rock salt structure based portions and infinite layer structure portions, wherein the rock salt structure based portion has a structure that an atoms layer having 0.5–1.5 oxygen atoms, in case the total atoms number of Pb, M and A1 is one, and an atoms layer having one or less oxygen atoms per one A2 atom, are stacked and the infinite layer structure portion has a structure that an atoms layer having 2 oxygen atoms per one Cu atom and an atoms layer of A3 atoms only, are stacked. Further, the present invention provides a method for manufacturing the above oxide superconductor by heat-treating a raw material of oxide superconductor at a temperature of 800°–1200° C. under superhigh pressure of 2–8 GPa.

16 Claims, 8 Drawing Sheets

[001] INCIDENCE

FIG. 5A

[110] INCIDENCE

OXIDE SUPERCONDUCTOR AND METHOD FOR MANUFACTURING THE SAME

BACKGROUND OF THE INVENTION

1. Field of the Invention

The present invention relates to an oxide superconductor which exhibits superconductivity at a temperature of liquid nitrogen or more (77K or more) and a method for manufacturing the same.

2. Description of the Related Art

Oxide superconductors have unique characteristics, which show an electric resistance of zero at a critical temperature (hereinafter referred to as Tc) or less, show perfect diamagnetisms and give a Josephson effect, and thereby they have been expected to be applied to a variety of fields, such as cables for power transmission, electric wires for generator, containment materials for nuclear fusion plasma, materials for magnetic levitation train, magnetic shield materials, or high-speed computers.

Following the time when Bednorz and Müller discovered La—Ba—Cu—O series oxide superconductor having Tc of approximately 30K in 1986, there have been reported oxide superconductors for relatively high temperature, such as Y—Ba—Cu—O series oxide superconductor (Tc≧90K), Bi—Sr—Ca—Cu—O series oxide superconductor (Tc≧110K), Tl—Ba—Ca—Cu—O series oxide superconductor (Tc≧125K), Hg—Ba—Ca—Cu—O series oxide superconductor (Tc≧135K). A variety of investigations have recently been performed concerning their preparation processes, physical properties, applications or the others.

High Tc values mean that cooling necessary to exhibit superconductivity is easy. Therefore, oxide superconductors of higher Tc values have extremely large advantages in practice, and such novel oxide superconductors have been expected to be discovered. However, although Tl—Ba—Ca—Cu—O series and Hg—Ba—Ca—Cu—O series oxide superconductor have been discovered and relatively high Tc values, they are very hard to handle, since they contain extremely toxic Tl or Hg. And, resources of rare earth elements, such as Y, are maldistributed and they require increased purifying cost. Such conditions have become large obstacles to practical applications of oxide superconductors.

SUMMARY OF THE INVENTION

The present invention has been performed in consideration of the aspects, and it is the object of the present invention to provide a novel oxide superconductor and a method for manufacturing the same, which not only has a Tc value of 100K or more but contains neither Tl or Hg (being extremely hard to handle) nor rare earth elements which are maldistributed and require a high purifying cost.

The present invention provides an oxide superconductor which is expressed in the composition formula (wherein $0 \leq x \leq 0.6$, $0 \leq y \leq 0.6$, $x+y \leq 0.6$, n denotes integers of 1 or more, $-0.6 \leq z \leq 0.5$, M denotes Cu or Cd, and A1, A2 and A3 denote at least one element of Ba, Sr and Ca, respectively) and which has a crystal structure comprising stacked rock salt structure based portions and infinite layer structure portions, wherein the rock salt structure based portion has a structure that an atoms layer having 0.5–1.5 oxygen atoms, in case the total atoms number of Pb, M and A1 is one, and an atoms layer having one or less oxygen atoms per one A2 atom, are stacked, and further the infinite layer structure portion has a structure that an atoms layer having two oxygen atoms per one Cu atom and an atoms layer of A3 atoms only are stacked.

Further, the present invention provides a method for manufacturing the above oxide superconductor by heat-treating a raw material of oxide superconductor at a temperature of 800°–1200° C. under a superhigh pressure of 2–8 GPa.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

The oxide superconductor according to the present invention prescribes Cu or Cd as M in the composition formula of $(Pb_{1-x-y}M_x(A1)_y)(A2)_2(A3)_{n-1}Cu_nO_{2n+3+z}$. Thereby, the advantage of using Cu as M, are ease of handling and reduced influences on the human body. When using Cd as M, better oxide superconductors may be obtained having a higher Tc value and volume fraction (the ratio of the superconductive phase to the sample made). Further, in the above composition formula, at least one element of Ba, Sr and Ca may be selected, as A1, A2 and A3, respectively, since oxide superconductors are not obtained without these elements. Also, a plurality of elements may be used, since two or more kinds of elements at one site is less sensitive to superconductivity.

In the above composition formula, x and y are set to $0 \leq x \leq 0.6$. When x or y exceeds 0.6, the rock salt structure based portion becomes unstable, and superconductivity is reduced. Also, x+y is set at $x+y \leq 0.6$, since, when x+y exceeds 0.6, superconductivity of the oxide superconductor become reduced.

Further, in the above composition formula, n is set to integers of one or more, and particularly in the case of the oxide superconductor having an infinite layer structure, n is preferred to be integers of 2–4 so as to give a higher Tc.

As to Cu oxides, it is preferred to be the condition giving a higher Tc value, i.e., average valences of Cu ion of +2.05–+2.25. In consideration of this average valence, z is ordinarily preferred to be set to $-0.6 \leq z \leq 0.5$.

In the oxide superconductor according to the present invention, the rock salt structure based portion has a structure that an atoms layer having 0.5–1.5 oxygen atoms, in the case where the total atoms number of Pb, M and A1 is one, and an atoms layer having one or less oxygen atoms per one A2 atom, are stacked. That is to say, in FIG. 1 it has a structure that the (Pb, M, A1)- O layer and the A2- O layer are stacked.

In this structure, even if the position of the alkaline earth element A1 is occupied by either any element of Ba, Sr and Ca or a plurality of these elements, large differences do not created to superconductivity. Also, the A2 position tends to be occupied by Sr or Ba, but Ca could occur partially as a solid solution. In all cases, the Tc value and volume fraction are not largely affected. The reasons why, in the (Pb, M, A1)- O layer, oxygen atoms are prescribed to 0.5–1.5, in the case the total atoms of Pb, M and A1 is one and further, in the A2- O layer, oxygen atoms per one A2 atom is prescribed to one or less is to maintain the Cu valence of the infinite layer portion within +2.05–+2.25, where superconductivity is exhibited. Further, changes in oxygen amount (z) are created by an increase or decrease in the oxygen amount of the (Pb, M, A1)- O layer and the A2- O layer.

In the oxygen superconductor according to the present invention, the infinite layer structure portion has a structure that an atoms layer having 2 oxygen atoms per one Cu atom and an atoms layer of A3 atoms only are stacked. That is to say, in FIG. 1, the portion has a structure that the Cu-$O_2$ layer and the A3 layer are stacked.

The process for preparing the oxygen superconductor according to the present invention is characterized by effecting heat-treatment on a raw material of oxide superconductor at a temperature of 800°–1200° C. under a superhigh pressure of 2–8 GPa. Thus, the pressure of the heat-treatment is set at 2–8 GPa. A pressure below 2 GPa is too low to obtain the oxygen superconductor according to the present invention, and, when the pressure exceeds 8 GPa, special pressure generation techniques to obtain high pressure are required which are not practical for industrial applications in terms of equipment and operation costs. And, temperature of the heat treatment is set at 800°–1200° C. A temperature below 800° C. is too low to obtain the oxygen superconductor according to the present invention, and a temperature above 1200° C. is too high for the raw material to be dissolved.

Hereinafter, some examples according to the present invention will be concretely described with reference to the drawings.

(Example 1)

Each raw material powder of $SrCO_3$ and CuO having a purity of 99.9% or more is weighed at a molar ratio of 1:1 and mixed. The mixed powder was calcined at 970° C. for 10 hours in the air to obtain the calcined material and be ground. The calcination and grinding were repeated several times, and $SrCuO_2$ was made as the precursor.

On the other hand, each raw material powder of $CaCO_2$ and CuO having a purity of 99.9% or more is weighed at a molar ratio of 2:1 and mixed. The mixed powder is calcined at 970° C. for 10 hours in the air, as shown above, to obtain the calcined material and be ground. The calcination and grinding were repeated several times, and $Ca_2CuO_3$ was made as the precursor.

Next, the resulting $SrCuO_2$ and $Ca_2CuO_3$, as well as raw material powders of PbO and CuO having a purity of 99.9% or more are mixed at a molar ratio of Pb:Sr:Ca:Cu= 0.5:2:2:3.5 to obtain a mixed powder. The mixed powder was filled into a gold capsule and $KClO_4$ was further added as a oxidant in order to control the oxygen amount of the oxide superconductor, and then the gold capsule was sealed. This gold capsule was located inside a hexagonal cubic anvil type superhigh pressure generator, and the gold capsule was heat-treated at 900° C. for 30 minutes under a pressure of 5 GPa. The heat-treatment was performed by forming a thin NaCl layer outside of the gold capsule, inserting the gold capsule into a graphite sleeve (heater), and applying an electric current during impression of pressure.

After the heat-treatment, the gold capsule was taken out from the generator, and also the oxide superconductor was taken out from the capsule.

Figure 2:
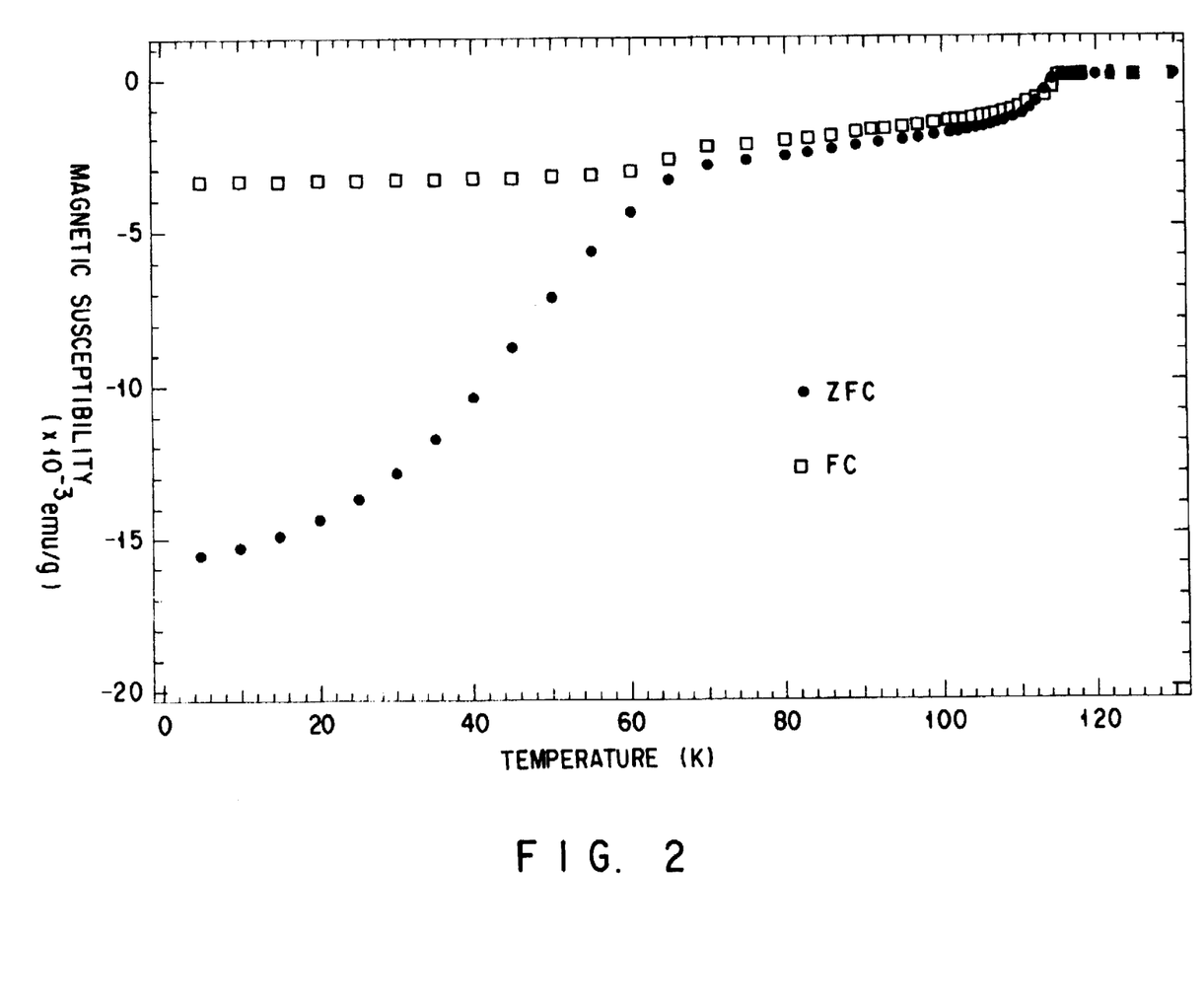
FIG. 2 is a graph showing the temperature dependence of magnetic susceptibility of the oxide superconductor of Example 1.

Temperature dependencies as to magnetic susceptibility of the obtained oxide superconductor were investigated. The result is shown in FIG. 2. Measurements of magnetic susceptibility were performed through two modes, i.e., zero magnetic field cooling (ZFC) wherein measurements are performed during gradual increase in temperature under an impression of 1 θOe magnetic field, followed by cooling the oxide superconductor until 4.2K in the zero magnetic field; and magnetic field cooling (FC) wherein the oxide superconductor is cooled under a 1 θOe magnetic field. As will be understood from FIG. 2, the temperature which shows diamagnetism (Tc) was 115K. Also, a volume fraction at 5K was estimated to be 26% from FC data, which was a relatively high value.

Figure 3:
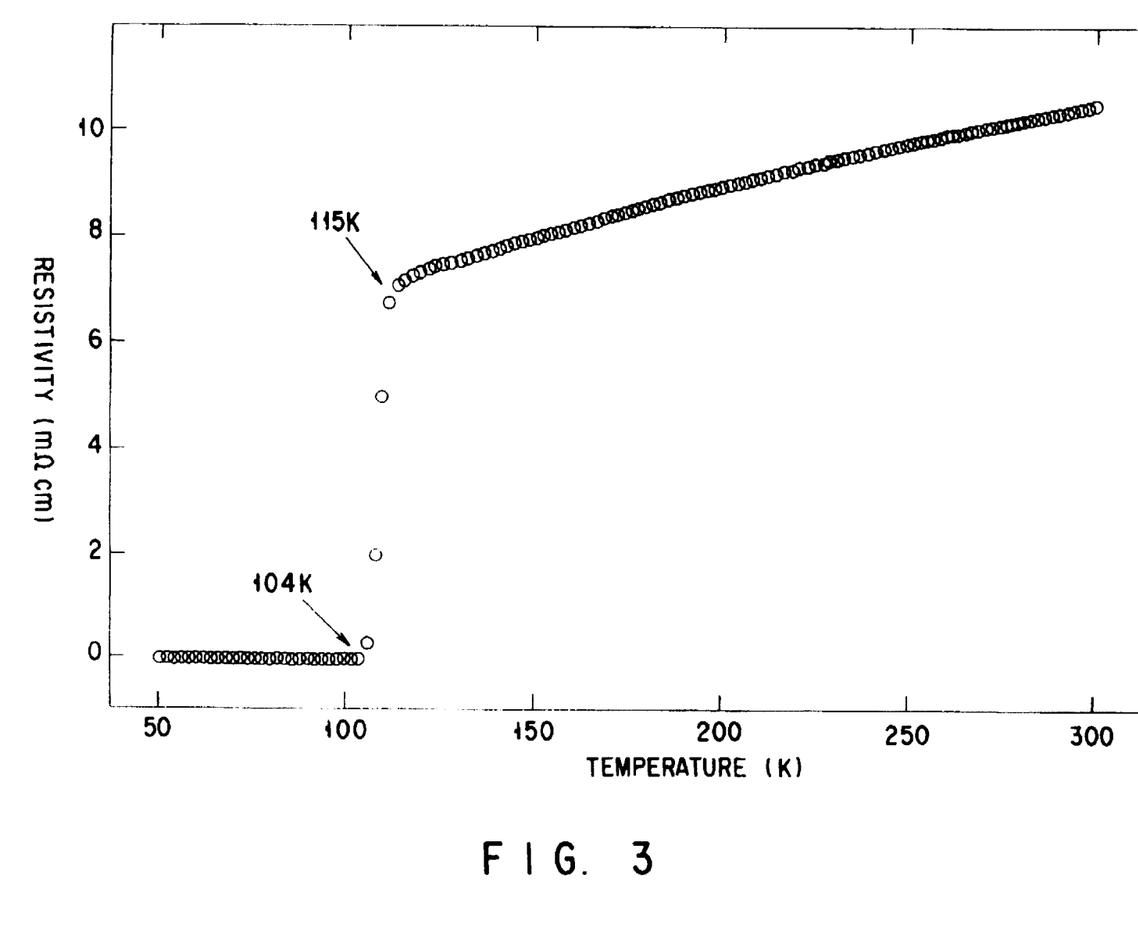
FIG. 3 is a graph showing the temperature dependence of resistivity of the oxide superconductor of Example 1.

Next, temperature dependencies as to electric resistivity of the obtained oxide superconductor were investigated. The result is shown in FIG. 3. Measurements of electric resistivity were performed through an ordinary four-terminal process. As will be understood from FIG. 3, the resistivity decreases as the temperature decreases, just as is the metal, and at approximately 115K decreases rapidly, and then the resistance becomes zero at 104K.

Figure 4:
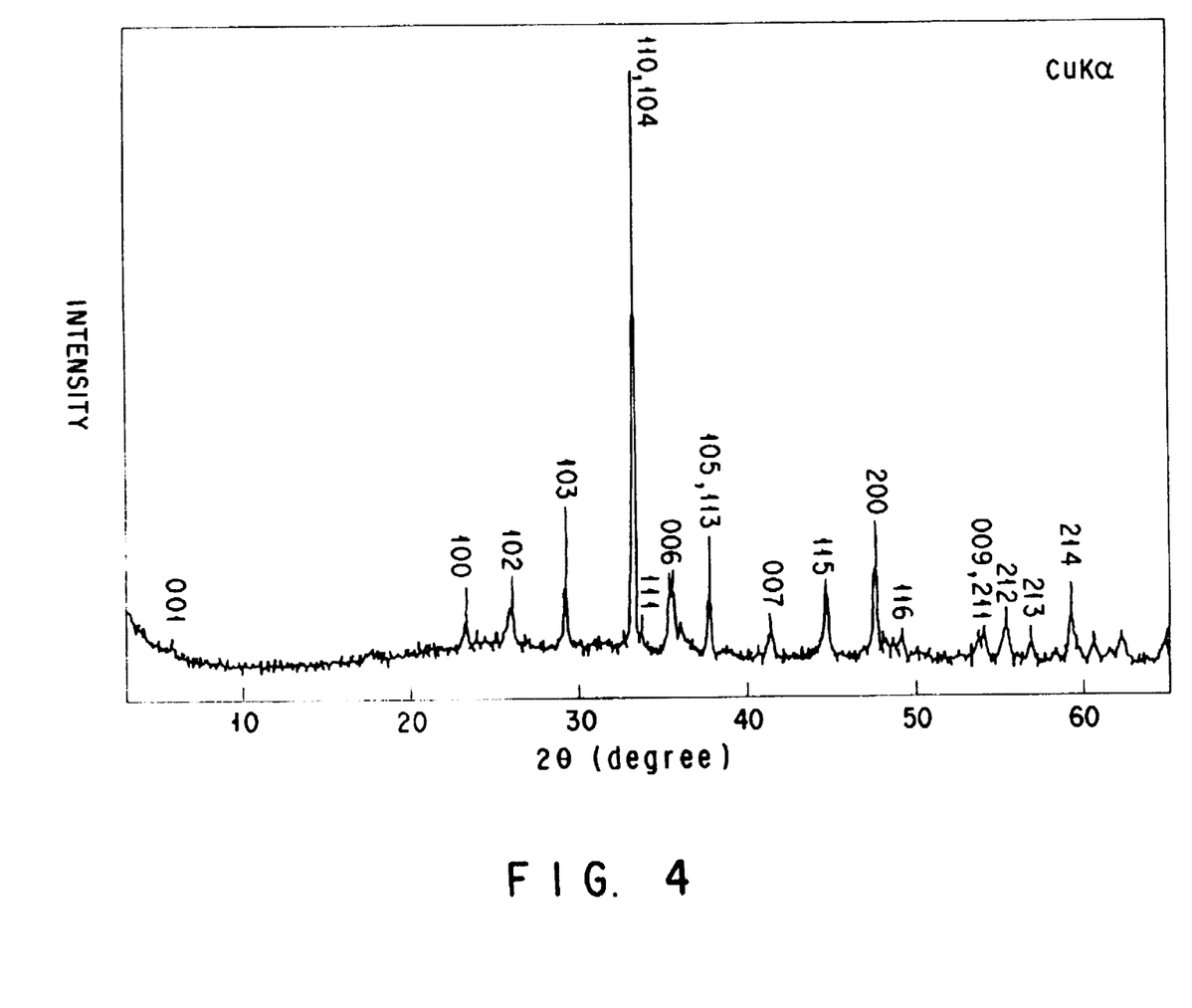
FIG. 4 is an X-ray diffraction pattern of the oxide superconductor of Example 1.
Figure 5A:
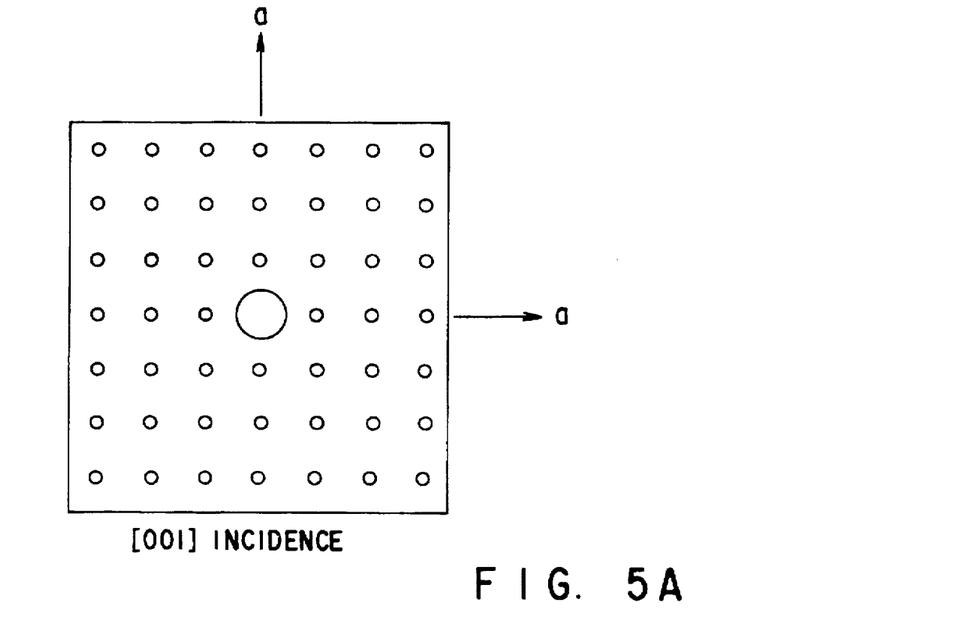
FIGS. 5A and 5B are electron beam diffraction patterns of the oxide superconductors of Example 1.
Figure 5B:
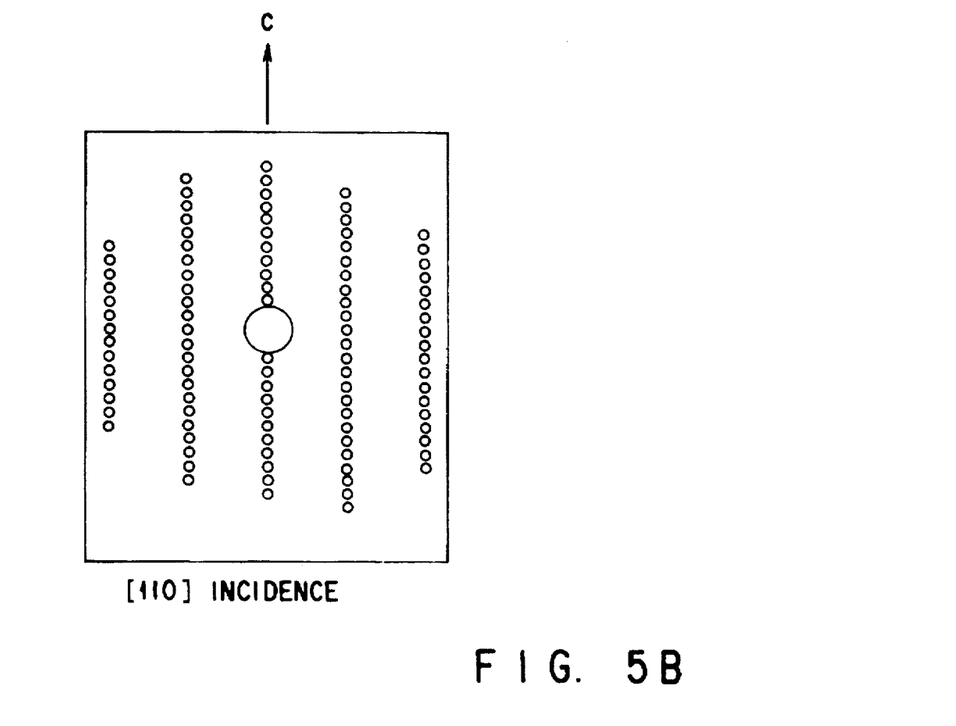

Also, the oxide superconductor powder was investigated through an X-ray diffraction and a high-resolution transmission electron microscope, and it was insured that main phase of the oxide superconductor had the composition of $(Pb_{0.5}Cu_{0.5})\ Sr_2Ca_2Cu_3O_{9+z}$. The X-ray diffraction pattern of the oxide superconductor powder is shown in FIG. 4. In FIGS. 5A and 5B, there are shown electron beam diffraction patterns of the oxide superconductor. FIG. 5A shows a diffraction pattern irradiating a electron beam from the [001] direction, and FIG. 5B shows a pattern irradiating from the [110] direction. From these diffraction patterns, the crystal structure unit cell is found to be a tetragonal system having an a-axial length of 0.382 nm and a c-axial length of 1.55 nm.

Figure 6:
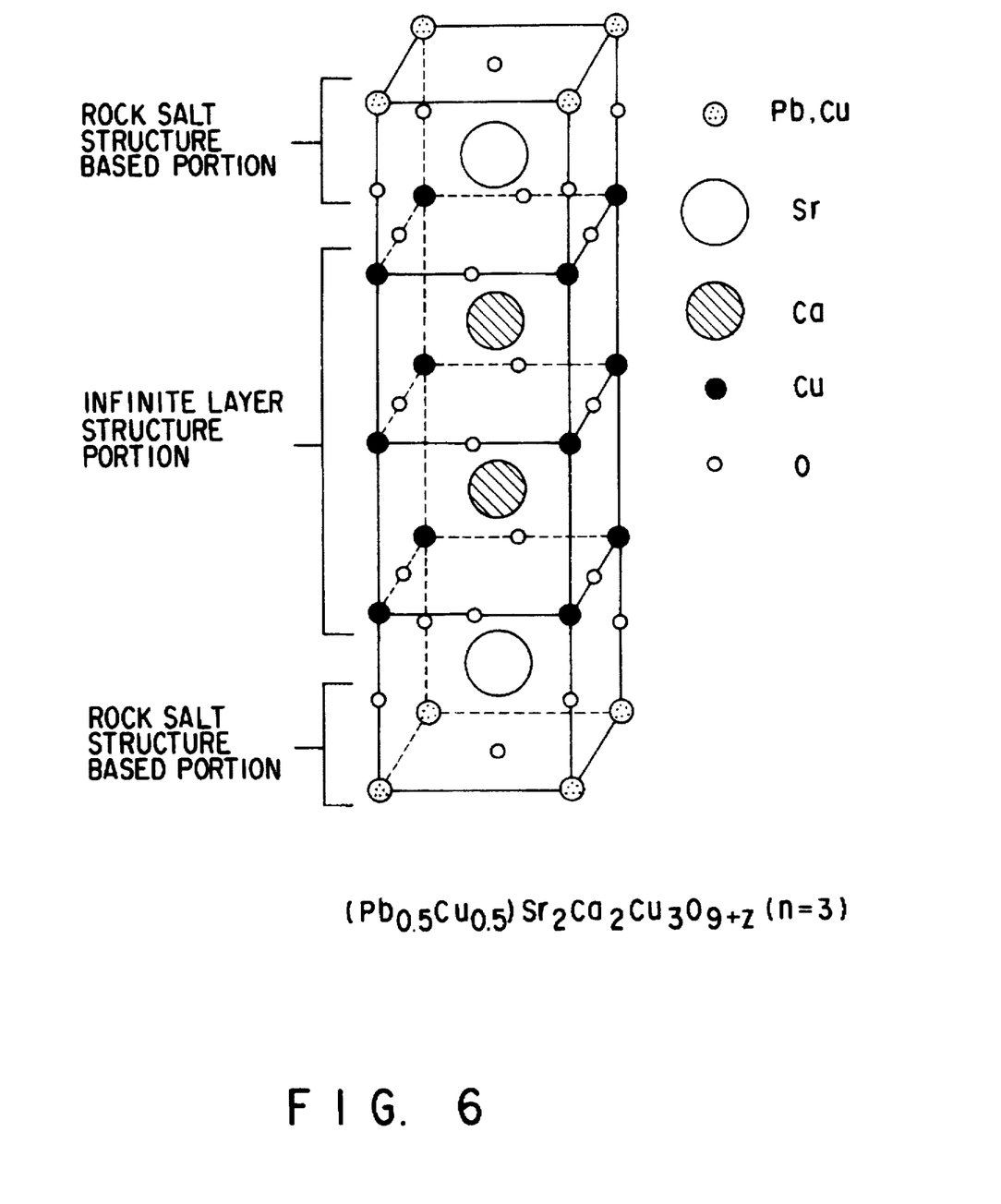
FIG. 6 is a schematic view showing the crystal structure of the oxide superconductor of Example 1 according to the present invention.

FIG. 6 shows the crystal structure of the oxide superconductor of Example 1. In this crystal structure, the infinite layer portion corresponds to the case of n=3, and oxygens at the rock salt structure based portion are partially lost, not shown in FIG. 6, so that the average valence of Cu becomes between +2.05–+2.25, where superconductivity are exhibited.

(Example 2)

Figure 1:
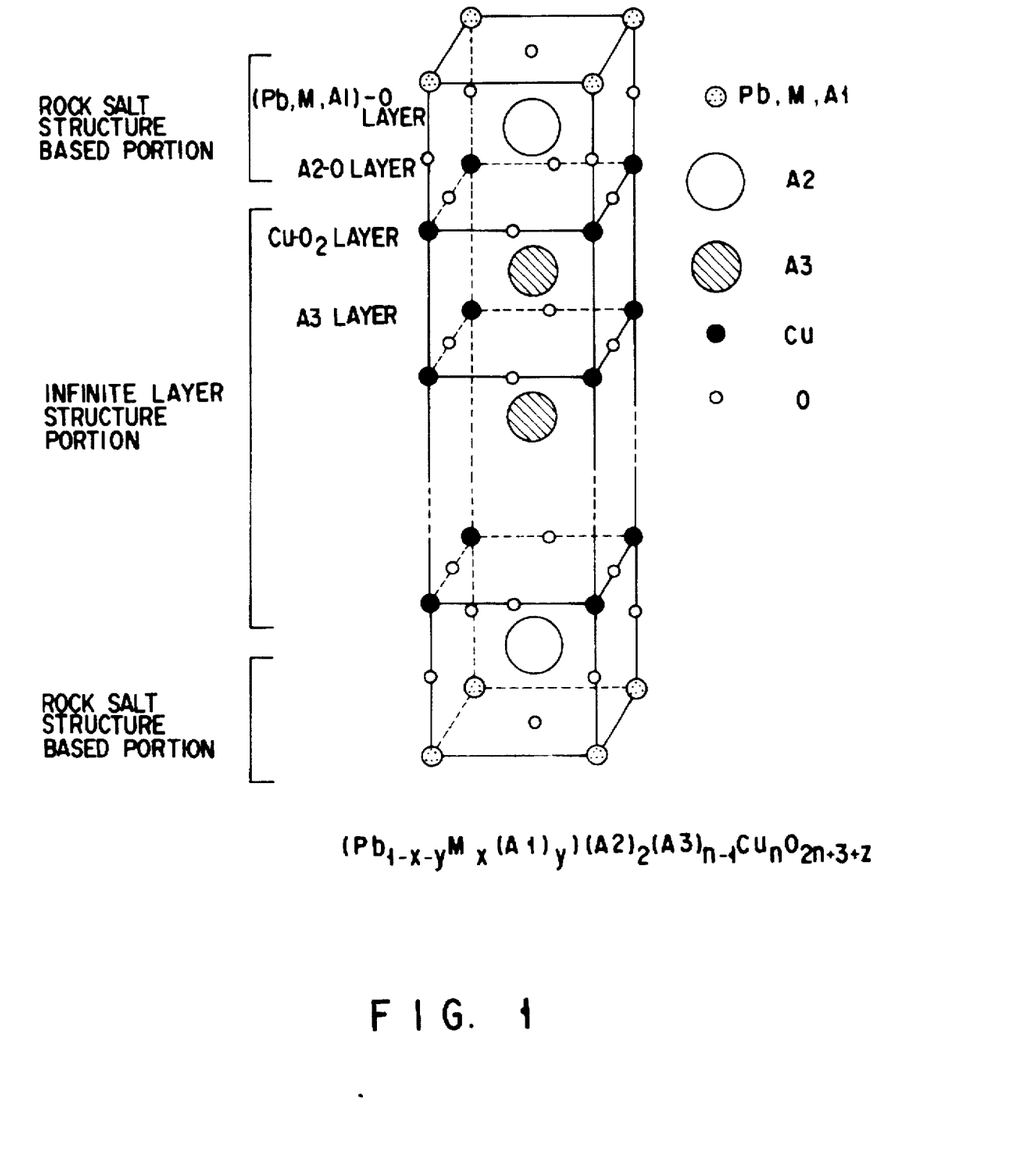
FIG. 1 is a schematic view showing one example of crystal structure of oxide superconductors according to the present invention.

The resulted precursors $SrCuO_2$ and $Ca_2CuO_3$ in FIG. 1 as well as raw material powders of PbO and CdO having a purity of 99.9% or more are mixed at a molar ratio of Pb:Cd:Sr:Ca:Cu=0.5:0.5:2:2:3 to obtain a mixed powder. The mixed powder was heat-treated under superhigh pressure to obtain the oxide superconductor in a similar manner as Example 1.

Figure 7:
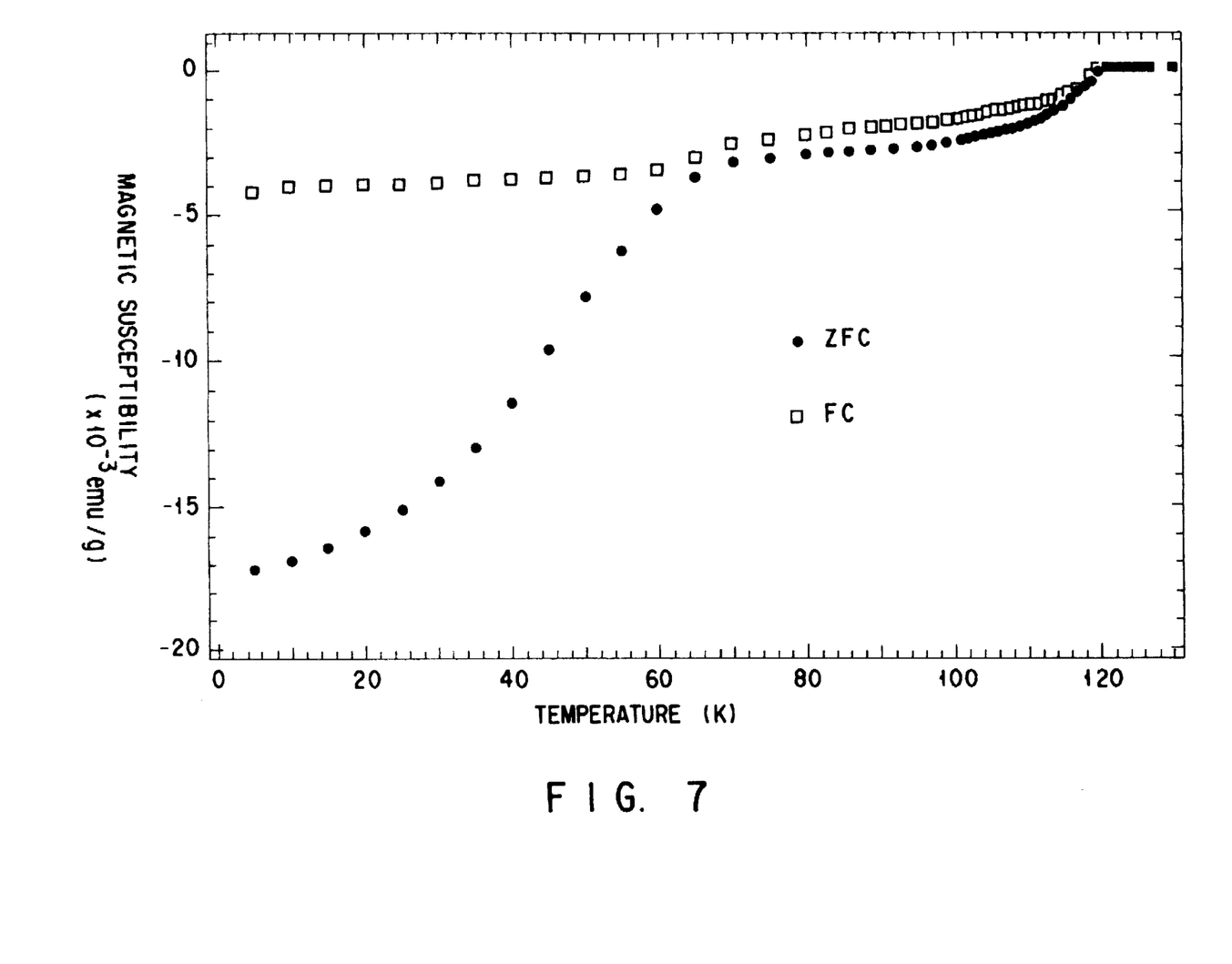
FIG. 7 is a graph showing the temperature dependence of magnetic susceptibility of the oxide superconductor of Example 2.
Figure 8:
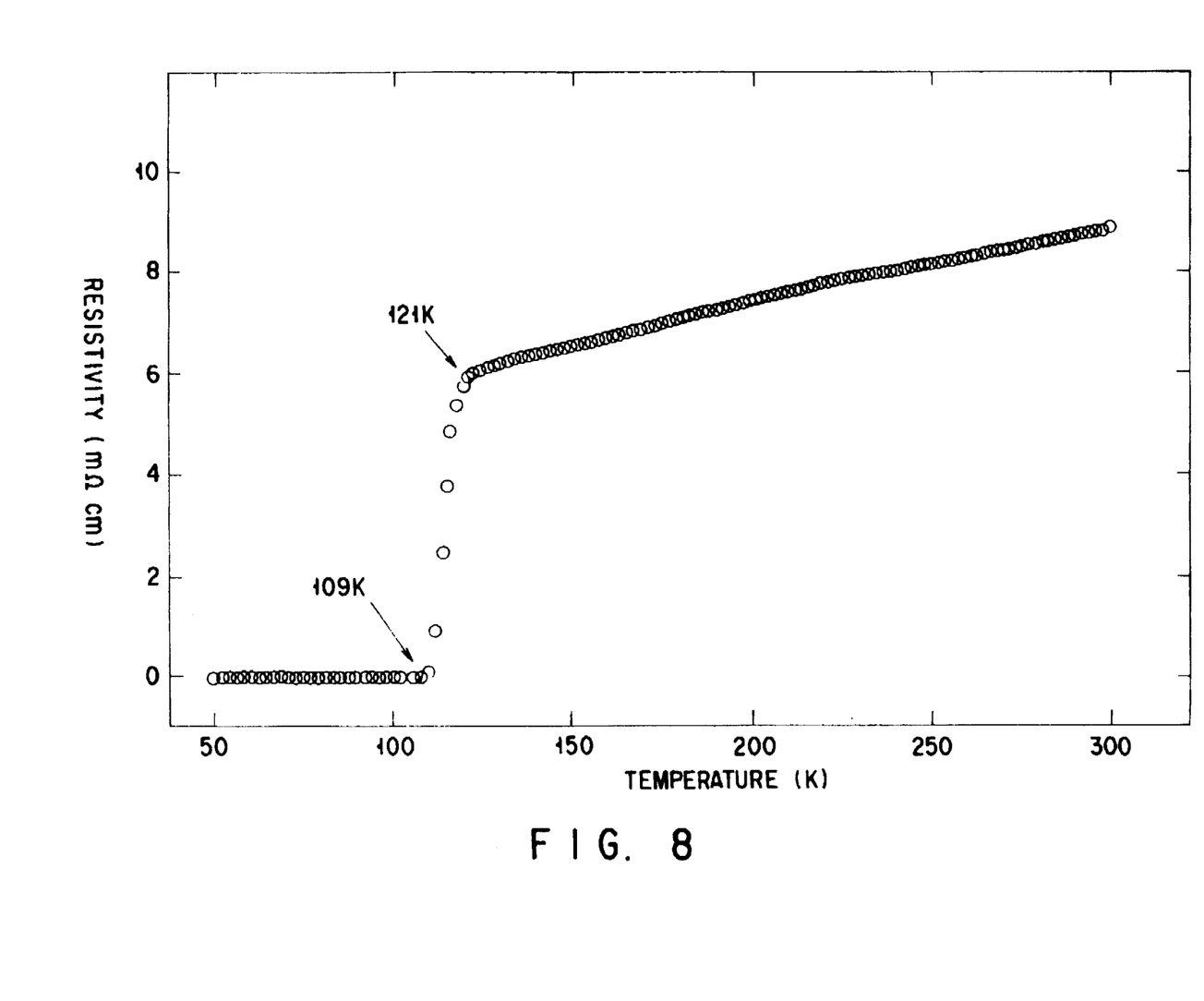
FIG. 8 is a graph showing the temperature dependence of resistivity of the oxide superconductor of Example 2.

Temperature dependencies as to magnetic susceptibility of the obtained oxide superconductor were investigated in a similar manner Example 1. The result is shown in FIG. 7. As will be understood from FIG. 7, the temperature which shows diamagnetism (Tc) was 121K. Also, volume fraction at 5K was estimated to be 32% from FC data, which was a relatively high value. Further, temperature dependencies as to electric resistivity of the obtained oxide superconductor were investigated in a similar manner as Example 1, and the result is shown in FIG. 8. As will be understood from FIG. 8, the electric resistivity decreases as the temperature decreases, just as is the metal, and at approximately 121K decreases rapidly, and then the resistance becomes zero at 109K. Further, the oxide superconductor powder was investigated through the X-ray diffraction and the high-resolution transmission electron microscope, and it was insured that main phase of the oxide superconductor had the composition of $(Pb_{0.5}Cd_{0.5})Sr_2Ca_2Cu_3O_{9+z}$. And, the infinite layer portion corresponds to n=3 similarly to Example 1.

(Example 3)

By varying preparation conditions (pressure, temperature), various oxide superconductors were made which have compositions of $(Pb_{1-x-y}M_x(A1)_y)(A2)_2(A3)_{n-1}(Cu)_n(O)_{2n+3+z}$, i.e., A1, A2 and A3 element, number of infinite layer, and x and y value, were changed variously. Concerning each oxide superconductor, the critical temperature Tc and volume fraction were investigated. The result as well as preparation conditions and the composition are shown in the following Table 1–4. And, Table 1 and 2 show the case that the element M is Cu, and Table 3 and 4 show the case that the element M is Cd.

As will be apparent from Table 1–4, all the oxide superconductors which were made under the pressure and temperature condition prescribed according to the present invention have a high Tc value of 100K or more. On the contrary, oxide superconductors made beyond the range of the pressure and temperature condition prescribed according to the present invention (sample nos. 4, 8, 9, 25, 29, 47, 51, 52, 63, 67) were all of a non-superconductive phase. And, when Cd is used as the element M, there is a trend that the oxide superconductors have a higher Tc and volume fraction than that obtained when Cu is used.

TABLE 1

| Sample No. | Infinite Layer No. (n) | A1 | A2 | A3 | Composition Formula |
|---|---|---|---|---|---|
| 1 | 3 | — | Sr | Ca | $(Pb_{0.5}Cu_{0.5})Sr_2Ca_2Cu_3O_{9+z}$ |
| 2 | 3 | — | Sr | Ca | $(Pb_{0.5}Cu_{0.5})Sr_2Ca_2Cu_3O_{9+z}$ |
| 3 | 3 | — | Sr | Ca | $(Pb_{0.5}Cu_{0.5})Sr_2Ca_2Cu_3O_{9+z}$ |
| 4 | 3 | — | Sr | Ca | $(Pb_{0.5}Cu_{0.5})Sr_2Ca_2Cu_3O_{9+z}$ |
| 5 | 3 | — | Sr | Ca | $(Pb_{0.5}Cu_{0.5})Sr_2Ca_2Cu_3O_{9+z}$ |
| 6 | 3 | — | Sr | Ca | $(Pb_{0.5}Cu_{0.5})Sr_2Ca_2Cu_3O_{9+z}$ |
| 7 | 3 | — | Sr | Ca | $(Pb_{0.5}Cu_{0.5})Sr_2Ca_2Cu_3O_{9+z}$ |
| 8 | 3 | — | Sr | Ca | $(Pb_{0.5}Cu_{0.5})Sr_2Ca_2Cu_3O_{9+z}$ |

TABLE 1-continued

| 9 | 3 | — | Sr | Ca | $(Pb_{0.5}Cu_{0.5})Sr_2Ca_2Cu_3O_{9+z}$ |
| 10 | 3 | — | Sr | Ca | $(Pb_{0.5}Cu_{0.5})Sr_2Ca_2Cu_3O_{9+z}$ |
| 11 | 3 | — | Sr | Ca | $(Pb_{0.5}Cu_{0.5})Sr_2Ca_2Cu_3O_{9+z}$ |
| 12 | 3 | — | Sr | Ca | $(Pb_{0.5}Cu_{0.5})Sr_2Ca_2Cu_3O_{9+z}$ |
| 13 | 3 | — | Sr | Ca | $(Pb_{0.8}Cu_{0.2})Sr_2Ca_2Cu_3O_{9+z}$ |

| | Heat Treatment Condition | | | | |
|---|---|---|---|---|---|
| Sample No. | Temperature (°C.) | Time (Hours) | Pressure (GPa) | Critical Temperature (K) | Volume Fraction (%) | Note |
| 1 | 900 | 0.5 | 5 | 115 | 26 | Example 1 |
| 2 | 900 | 3 | 5 | 115 | 29 | |
| 3 | 900 | 0.2 | 5 | 111 | 12 | |
| 4 | 700 | 0.5 | 5 | * | * | Comparative Example |
| 5 | 800 | 0.5 | 5 | 106 | 8 | |
| 6 | 1000 | 0.5 | 5 | 109 | 15 | |
| 7 | 1200 | 0.5 | 5 | 102 | 8 | |
| 8 | 1300 | 0.5 | 5 | * | * | Comparative Example |
| 9 | 900 | 0.5 | 1 | * | * | Comparative Example |
| 10 | 850 | 0.5 | 2 | 107 | 20 | |
| 11 | 900 | 0.5 | 2 | 110 | 8 | |
| 12 | 900 | 0.5 | 8 | 113 | 10 | |
| 13 | 900 | 0.5 | 5 | 105 | 9 | |

| Sample No. | Infinite Layer No. (n) | A1 | A2 | A3 | Composition Formula |
|---|---|---|---|---|---|
| 14 | 3 | Sr | Sr | Ca | $(Pb_{0.5}Sr_{0.5})Sr_2Ca_2Cu_3O_{9+z}$ |
| 15 | 3 | Sr | Sr | Ca | $(Pb_{0.5}Sr_{0.5})Sr_2Ca_2Cu_3O_{9+z}$ |
| 16 | 3 | Sr | Sr | Ca | $(Pb_{0.5}Sr_{0.5})Sr_2Ca_2Cu_3O_{9+z}$ |
| 17 | 3 | Sr | Sr | Ca | $(Pb_{0.5}Cu_{0.4}Sr_{0.1})Sr_2Ca_2Cu_3O_{9+z}$ |
| 18 | 3 | Sr | Sr | Ca | $(Pb_{0.5}Cu_{0.25}Sr_{0.25})Sr_2Ca_2Cu_3O_{9+z}$ |
| 19 | 3 | Sr | Sr | Ca | $(Pb_{0.5}Cu_{0.1}Sr_{0.4})Sr_2Ca_2Cu_3O_{9+z}$ |
| 20 | 3 | Ca | Sr | Ca | $(Pb_{0.5}Ca_{0.5})Sr_2Ca_2Cu_3O_{9+z}$ |
| 21 | 3 | Ca | Sr | Ca | $(Pb_{0.5}Cu_{0.25}Ca_{0.25})Sr_2Ca_2Cu_3O_{9+z}$ |
| 22 | 3 | Ba | Sr | Ca | $(Pb_{0.5}Ba_{0.5})Sr_2Ca_2Cu_3O_{9+z}$ |
| 23 | 3 | Ba | Sr | Ca | $(Pb_{0.5}Cu_{0.25}Ba_{0.25})Sr_2Ca_2Cu_3O_{9+z}$ |

| | Heat Treatment Condition | | | | |
|---|---|---|---|---|---|
| Sample No. | Temperature (°C.) | Time (Hours) | Pressure (GPa) | Critical Temperature (K) | Volume Fraction (%) | Note |
| 14 | 900 | 0.5 | 5 | 112 | 22 | |
| 15 | 800 | 0.5 | 5 | 108 | 13 | |
| 16 | 1000 | 0.5 | 5 | 110 | 17 | |
| 17 | 900 | 0.5 | 5 | 114 | 18 | |
| 18 | 900 | 0.5 | 5 | 112 | 21 | |
| 19 | 900 | 0.5 | 5 | 112 | 20 | |
| 20 | 900 | 0.5 | 5 | 113 | 24 | |
| 21 | 900 | 0.5 | 5 | 112 | 21 | |
| 22 | 900 | 0.5 | 5 | 111 | 14 | |
| 23 | 900 | 0.5 | 5 | 111 | 14 | |

*Non-Superconductive Phase

TABLE 2

| Sample No. | Infinite Layer No. (n) | A1 | A2 | A3 | Composition Formula |
|---|---|---|---|---|---|
| 24 | 3 | — | Ba | Ca | $(Pb_{0.5}Cu_{0.5})Ba_2Ca_2Cu_3O_{9+z}$ |
| 25 | 3 | — | Ba | Ca | $(Pb_{0.5}Cu_{0.5})Ba_2Ca_2Cu_3O_{9+z}$ |
| 26 | 3 | — | Ba | Ca | $(Pb_{0.5}Cu_{0.5})Ba_2Ca_2Cu_3O_{9+z}$ |
| 27 | 3 | — | Ba | Ca | $(Pb_{0.5}Cu_{0.5})Ba_2Ca_2Cu_3O_{9+z}$ |
| 28 | 3 | — | Ba | Ca | $(Pb_{0.5}Cu_{0.5})Ba_2Ca_2Cu_3O_{9+z}$ |
| 29 | 3 | — | Ba | Ca | $(Pb_{0.5}Cu_{0.5})Ba_2Ca_2Cu_3O_{9+z}$ |

TABLE 2-continued

| Sample No. | | | | Composition |
|---|---|---|---|---|
| 30 | 3 | — | Ba | Ca $(Pb_{0.8}Cu_{0.2})Ba_2Ca_2Cu_3O_{9+z}$ |
| 31 | 3 | Sr | Ba | Ca $(Pb_{0.5}Sr_{0.5})Ba_2Ca_2Cu_3O_{9+z}$ |
| 32 | 3 | Sr | Ba | Ca $(Pb_{0.5}Cu_{0.25}Sr_{0.25})Ba_2Ca_2Cu_3O_{9+z}$ |
| 33 | 3 | Ca | Ba | Ca $(Pb_{0.5}Cu_{0.5})Ba_2Ca_2Cu_3O_{9+z}$ |

| | Heat Treatment Condition | | | | | |
|---|---|---|---|---|---|---|
| Sample No. | Temperature (°C.) | Time (Hours) | Pressure (GPa) | Critical Temperature (K) | Volume Fraction (%) | Note |
| 24 | 900 | 0.5 | 5 | 115 | 24 | |
| 25 | 700 | 0.5 | 5 | * | * | Comparative Example |
| 26 | 800 | 0.5 | 5 | 108 | 8 | |
| 27 | 1000 | 0.5 | 5 | 111 | 17 | |
| 28 | 1200 | 0.5 | 5 | 105 | 9 | |
| 29 | 1300 | 0.5 | 5 | * | * | Comparative Example |
| 30 | 900 | 0.5 | 5 | 110 | 20 | |
| 31 | 900 | 0.5 | 5 | 113 | 24 | |
| 32 | 900 | 0.5 | 5 | 113 | 21 | |
| 33 | 900 | 0.5 | 5 | 114 | 23 | |

| Sample No. | Infinite Layer No. (n) | A1 | A2 | A3 | Composition Formula |
|---|---|---|---|---|---|
| 34 | 3 | Ca | Ba | Ca | $(Pb_{0.5}Cu_{0.25}Ca_{0.25})Ba_2Ca_2Cu_3O_{9+z}$ |
| 35 | 3 | Ba | Ba | Ca | $(Pb_{0.5}Ba_{0.5})Ba_2Ca_2Cu_3O_{9+z}$ |
| 36 | 3 | Ba | Ba | Ca | $(Pb_{0.5}Cu_{0.25}Ba_{0.25})Ba_2Ca_2Cu_3O_{9+z}$ |
| 37 | 3 | — | Sr,Ba | Ca | $(Pb_{0.5}Cu_{0.5})(SrBa)_2Ca_2Cu_3O_{9+z}$ |
| 38 | 3 | — | Sr,Ba | Ca | $(Pb_{0.5}Cu_{0.5})(SrBa)_2Ca_2Cu_3O_{9+z}$ |
| 39 | 3 | — | Sr,Ba | Ca | $(Pb_{0.5}Cu_{0.5})(SrBa)_2Ca_2Cu_3O_{9+z}$ |
| 40 | 4 | — | Sr | Ca | $(Pb_{0.5}Cu_{0.5})Sr_2Ca_3Cu_4O_{11+z}$ |
| 41 | 4 | — | Sr | Ca | $(Pb_{0.5}Cu_{0.5})Sr_2Ca_3Cu_4O_{11+z}$ |
| 42 | 4 | — | Sr | Ca | $(Pb_{0.5}Cu_{0.5})Sr_2Ca_3Cu_4O_{11+z}$ |
| 43 | 4 | — | Ba | Ca | $(Pb_{0.5}Cu_{0.5})Ba_2Ca_3Cu_4O_{11+z}$ |

| | Heat Treatment Condition | | | | | |
|---|---|---|---|---|---|---|
| Sample No. | Temperature (°C.) | Time (Hours) | Pressure (GPa) | Critical Temperature (K) | Volume Fraction (%) | Note |
| 34 | 900 | 0.5 | 5 | 113 | 26 | |
| 35 | 900 | 0.5 | 5 | 112 | 19 | |
| 36 | 900 | 0.5 | 5 | 113 | 20 | |
| 37 | 900 | 0.5 | 5 | 110 | 22 | |
| 38 | 800 | 0.5 | 5 | 104 | 14 | |
| 39 | 1200 | 0.5 | 5 | 102 | 9 | |
| 40 | 900 | 0.5 | 5 | 106 | 11 | |
| 41 | 800 | 0.5 | 5 | 101 | 6 | |
| 42 | 1100 | 0.5 | 5 | 100 | 5 | |
| 43 | 900 | 0.5 | 5 | 108 | 9 | |

*Non-Superconductive Phase

TABLE 3

| Sample No. | Infinite Layer No. (n) | A1 | A2 | A3 | Composition Formula |
|---|---|---|---|---|---|
| 44 | 3 | — | Sr | Ca | $(Pb_{0.5}Cd_{0.5})Sr_2Ca_2Cu_3O_{9+z}$ |
| 45 | 3 | — | Sr | Ca | $(Pb_{0.5}Cd_{0.5})Sr_2Ca_2Cu_3O_{9+z}$ |
| 46 | 3 | — | Sr | Ca | $(Pb_{0.5}Cd_{0.5})Sr_2Ca_2Cu_3O_{9+z}$ |
| 47 | 3 | — | Sr | Ca | $(Pb_{0.5}Cd_{0.5})Sr_2Ca_2Cu_3O_{9+z}$ |
| 48 | 3 | — | Sr | Ca | $(Pb_{0.5}Cd_{0.5})Sr_2Ca_2Cu_3O_{9+z}$ |
| 49 | 3 | — | Sr | Ca | $(Pb_{0.5}Cd_{0.5})Sr_2Ca_2Cu_3O_{9+z}$ |
| 50 | 3 | — | Sr | Ca | $(Pb_{0.5}Cd_{0.5})Sr_2Ca_2Cu_3O_{9+z}$ |
| 51 | 3 | — | Sr | Ca | $(Pb_{0.5}Cd_{0.5})Sr_2Ca_2Cu_3O_{9+z}$ |
| 52 | 3 | — | Sr | Ca | $(Pb_{0.5}Cd_{0.5})Sr_2Ca_2Cu_3O_{9+z}$ |

TABLE 3-continued

| | Heat Treatment Condition | | | | | |
|---|---|---|---|---|---|---|
| Sample No. | Temperature (°C.) | Time (Hours) | Pressure (GPa) | Critical Temperature (K) | Volume Fraction (%) | Note |
| 44 | 900 | 0.5 | 5 | 121 | 31 | Example 2 |
| 45 | 900 | 3 | 5 | 121 | 34 | |
| 46 | 900 | 0.2 | 5 | 120 | 21 | |
| 47 | 700 | 0.5 | 5 | * | * | Comparative Example |
| 48 | 800 | 0.5 | 5 | 110 | 10 | |
| 49 | 1000 | 0.5 | 5 | 113 | 15 | |
| 50 | 1200 | 0.5 | 5 | 106 | 11 | |
| 51 | 1300 | 0.5 | 5 | * | * | Comparative Example |
| 52 | 900 | 0.5 | 1 | * | * | Comparative Example |

| Sample No. | Infinite Layer No. (n) | A1 | A2 | A3 | Composition Formula |
|---|---|---|---|---|---|
| 53 | 3 | — | Sr | Ca | $(Pb_{0.5}Cd_{0.5})Sr_2Ca_2Cu_3O_{9+z}$ |
| 54 | 3 | — | Sr | Ca | $(Pb_{0.5}Cd_{0.5})Sr_2Ca_2Cu_3O_{9+z}$ |
| 55 | 3 | — | Sr | Ca | $(Pb_{0.5}Cd_{0.5})Sr_2Ca_2Cu_3O_{9+z}$ |
| 56 | 3 | — | Sr | Ca | $(Pb_{0.8}Cd_{0.2})Sr_2Ca_2Cu_3O_{9+z}$ |
| 57 | 3 | Sr | Sr | Ca | $(Pb_{0.5}Cd_{0.4}Sr_{0.1})Sr_2Ca_2Cu_3O_{9+z}$ |
| 58 | 3 | Sr | Sr | Ca | $(Pb_{0.5}Cd_{0.25}Sr_{0.25})Sr_2Ca_2Cu_3O_{9+z}$ |
| 59 | 3 | Sr | Sr | Ca | $(Pb_{0.5}Cd_{0.1}Sr_{0.4})Sr_2Ca_2Cu_3O_{9+z}$ |
| 60 | 3 | Ca | Sr | Ca | $(Pb_{0.5}Cd_{0.25}Ca_{0.25})Sr_2Ca_2Cu_3O_{9+z}$ |
| 61 | 3 | Ba | Sr | Ca | $(Pb_{0.5}Cd_{0.25}Ba_{0.25})Sr_2Ca_2Cu_3O_{9+z}$ |

| | Heat Treatment Condition | | | | | |
|---|---|---|---|---|---|---|
| Sample No. | Temperature (°C.) | Time (Hours) | Pressure (GPa) | Critical Temperature (K) | Volume Fraction (%) | Note |
| 53 | 850 | 0.5 | 2 | 110 | 18 | |
| 54 | 900 | 0.5 | 2 | 112 | 10 | |
| 55 | 900 | 0.5 | 8 | 117 | 12 | |
| 56 | 900 | 0.5 | 5 | 109 | 9 | |
| 57 | 900 | 0.5 | 5 | 118 | 23 | |
| 58 | 900 | 0.5 | 5 | 115 | 21 | |
| 59 | 900 | 0.5 | 5 | 113 | 22 | |
| 60 | 900 | 0.5 | 5 | 115 | 25 | |
| 61 | 900 | 0.5 | 5 | 116 | 18 | |

*Non-Superconductive Phase

TABLE 4

| Sample No. | Infinite Layer No. (n) | A1 | A2 | A3 | Composition Formula |
|---|---|---|---|---|---|
| 62 | 3 | — | Ba | Ca | $(Pb_{0.5}Cd_{0.5})Ba_2Ca_2Cu_3O_{9+z}$ |
| 63 | 3 | — | Ba | Ca | $(Pb_{0.5}Cd_{0.5})Ba_2Ca_2Cu_3O_{9+z}$ |
| 64 | 3 | — | Ba | Ca | $(Pb_{0.5}Cd_{0.5})Ba_2Ca_2Cu_3O_{9+z}$ |
| 65 | 3 | — | Ba | Ca | $(Pb_{0.5}Cd_{0.5})Ba_2Ca_2Cu_3O_{9+z}$ |
| 66 | 3 | — | Ba | Ca | $(Pb_{0.5}Cd_{0.5})Ba_2Ca_2Cu_3O_{9+z}$ |
| 67 | 3 | — | Ba | Ca | $(Pb_{0.5}Cd_{0.5})Ba_2Ca_2Cu_3O_{9+z}$ |
| 68 | 3 | — | Ba | Ca | $(Pb_{0.8}Cd_{0.2})Ba_2Ca_2Cu_3O_{9+z}$ |
| 69 | 3 | Sr | Ba | Ca | $(Pb_{0.5}Cd_{0.25}Sr_{0.25})Ba_2Ca_2Cu_3O_{9+z}$ |

TABLE 4-continued

| Sample No. | Heat Treatment Condition | | | Critical Temperature (K.) | Volume Fraction (%) | Note |
|---|---|---|---|---|---|---|
| | Temperature (°C.) | Time (Hours) | Pressure (GPa) | | | |
| 62 | 900 | 0.5 | 5 | 121 | 29 | |
| 63 | 700 | 0.5 | 5 | * | * | Comparative Example |
| 64 | 800 | 0.5 | 5 | 110 | 13 | |
| 65 | 1000 | 0.5 | 5 | 113 | 17 | |
| 66 | 1200 | 0.5 | 5 | 107 | 10 | |
| 67 | 1300 | 0.5 | 5 | * | * | Comparative Example |
| 68 | 900 | 0.5 | 5 | 111 | 22 | |
| 69 | 900 | 0.5 | 5 | 116 | 25 | |

| Sample No. | Infinite Layer No. (n) | A1 | A2 | A3 | Composition Formula |
|---|---|---|---|---|---|
| 70 | 3 | Ca | Ba | Ca | $(Pb_{0.5}Cu_{0.25}Ca_{0.25})Ba_2Ca_2Cu_3O_{9+z}$ |
| 71 | 3 | Ba | Ba | Ca | $(Pb_{0.5}Cd_{0.25}Ba_{0.25})Ba_2Ca_2Cu_3O_{9+z}$ |
| 72 | 3 | — | Sr,Ba | Ca | $(Pb_{0.5}Cd_{0.5})(SrBa)_2Ca_2Cu_3O_{9+z}$ |
| 73 | 3 | — | Sr,Ba | Ca | $(Pb_{0.5}Cd_{0.5})(SrBa)_2Ca_2Cu_3O_{9+z}$ |
| 74 | 3 | — | Sr,Ba | Ca | $(Pb_{0.5}Cd_{0.5})(SrBa)_2Ca_2Cu_3O_{9+z}$ |
| 75 | 4 | — | Sr | Ca | $(Pb_{0.5}Cd_{0.5})Sr_2Ca_3Cu_4O_{11+z}$ |
| 76 | 4 | — | Sr | Ca | $(Pb_{0.5}Cd_{0.5})Sr_2Ca_3Cu_4O_{11+z}$ |
| 77 | 4 | — | Sr | Ca | $(Pb_{0.5}Cd_{0.5})Sr_2Ca_3Cu_4O_{11+z}$ |
| 78 | 4 | — | Ba | Ca | $(Pb_{0.5}Cd_{0.5})Ba_2Ca_3Cu_4O_{11+z}$ |

| Sample No. | Heat Treatment Condition | | | Critical Temperature (K.) | Volume Fraction (%) | Note |
|---|---|---|---|---|---|---|
| | Temperature (°C.) | Time (Hours) | Pressure (GPa) | | | |
| 70 | 900 | 0.5 | 5 | 118 | 26 | |
| 71 | 900 | 0.5 | 5 | 119 | 21 | |
| 72 | 900 | 0.5 | 5 | 114 | 26 | |
| 73 | 800 | 0.5 | 5 | 105 | 14 | |
| 74 | 1200 | 0.5 | 5 | 105 | 11 | |
| 75 | 900 | 0.5 | 5 | 108 | 11 | |
| 76 | 800 | 0.5 | 5 | 103 | 5 | |
| 77 | 1100 | 0.5 | 5 | 101 | 5 | |
| 78 | 900 | 0.5 | 5 | 110 | 10 | |

*Non-Superconductive Phase

The C-axial length of the oxide superconductor according to the present invention changes in response to the infinite layer number n. The c-axial length is expressed by the equation: c=0.53+0.34 n(nm), and 1.55 nm is equivalent to n=3. Since the c-axial length of the infinite layer structure unit cell is approximately 0.34 nm, the c-axial length becomes c=1.55+0.34 (nm) in the case where the infinite layer number n is 4. In this case also, it was insured that the oxide superconductors had a Tc value of 100K or more. Thus, the c-axial length becomes longer as the infinite layer number increases. Further, the a-axial length is approximately constant at 0.382±0.01 (nm).

As mentioned above, the oxide superconductor according to the present invention may be expressed by the composition formula of $(Pb_{1-x-y}M_x(A1)_y)(A2)_2(A3)_{n-1}(Cu)_n(O)_{2n+3+z}$; has a crystal structure involving stacking both rock salt structure based portions, each of which has a structure that an atoms layer having 0.5–1.5 oxygen atoms, in the case where the total atoms number of Pb, M and A1 is one, and an atoms layer having one or less oxygen atoms per one A2 atom are stacked, and infinite layer structure portions, each of which has a structure that an atoms layer having two oxygen atoms per one Cu atom and an atoms layer of A3 atoms only, are stacked; and exhibits a Tc value of 100K or more. Therefore, liquid nitrogen may be used as its coolant. Also, the oxide superconductor according to the present invention have advantages that neither Tl or Hg (being extremely hard to handle) nor rare earth elements which are maldistributed and requires high purifying cost are contained.

Furthermore, the process for preparing the above oxide superconductor according to the present invention may efficiently obtain the oxide superconductor having the above characteristics, since the raw material of oxide superconductor is heat-treated at a temperature of 800°–1200° C. under a superhigh pressure of 2–8 GPa to prepare the above oxide superconductor.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An oxide superconductor comprising a composition of the formula:

$(Pb_{1-x-y}M_x(A1)_y)(A2)_2(A3)_{n-1}(Cu)_n(O)_{2n+3+z}$ wherein
$0 \leq x \leq 0.6$,
$0 \leq y \leq 0.6$,
$x+y \leq 0.6$,
n is an integer of 3 or 4,
$-0.6 \leq z \leq 0.5$,
M is Cu or Cd and
A1, A2 and A3 are each independently one element selected from the group consisting of Ba, Sr and Ca, the oxide superconductor having a crystal structure comprising stacked layers in the following order: a first rock salt structure portion, an infinite layer structure stacked on the first rock salt structure portion and a second rock salt structure portion stacked on the infinite layer structure, the first rock salt structure portion and the second rock salt structure portion each comprising a (Pb, M, A1)-oxygen layer stacked on an A2-oxygen layer, said (Pb, M, A1)-oxygen layer having a ratio of the total number of atoms of Pb, M and A1 to the number of oxygen atoms of 1:0.5 to 1.5, said A2-oxygen layer having a ratio of the number of A2 atoms to the number of oxygen atoms of 1:1 or less, the infinite layer structure comprising a Cu-oxygen layer stacked on a layer of A3, the Cu-oxygen layer having a ratio of the number of copper atoms to the number of oxygen atoms of 1:2, wherein said composition is made by a process comprising the step of heat treating at 800° C. to 1200° C. under a superhigh pressure of 2 to 8 GPa.

2. The oxide superconductor according to claim 1, wherein said M is Cu, said A2 is Sr or Ba, said A3 is Ca, and n is 3 or 4.

3. The oxide superconductor according to claim 1, wherein said M is Cd, said A2 is Sr or Ba, said A3 is Ca, and n is 3 or 4.

4. The oxide superconductor according to claim 1, wherein an average valence of Cu ion is +2.05–+2.25.

5. A method for manufacturing an oxide superconductor comprising:
heating raw materials of an oxide superconductor at a temperature of 800° to 1200° C. under a superhigh pressure of 2 to 8 GPa;

to prepare an oxide superconductor comprising a composition of the formula: $(Pb_{1-x-y}M_x(A1)_y)(A2)_2(A3)_{n-1}(Cu)_n(O)_{2n+3+z}$ wherein $0 \leq x \leq 0.6$,
$0 \leq y \leq 0.6$,
$x+y \leq 0.6$, n is an integer of 3 or 4, $-0.6 \leq z \leq 0.5$ M is Cu or Cd and A1, A2 and A3 are each independently one element selected from the group consisting of Ba, Sr and Ca, the oxide superconductor having a crystal structure comprising stacked layers in the following order: a first rock salt structure portion, an infinite layer structure stacked on the first rock salt structure portion and a second rock salt structure portion stacked on the infinite layer structure, the first rock salt structure portion and the second rock salt structure portion each comprising a (Pb, M, A1)-oxygen layer stacked on an A2-oxygen layer, said (Pb, M, A1)-oxygen layer having a ratio of the total number of atoms of Pb, M and A1 to the number of oxygen atoms of 1:0.5 to 1.5, said A2-oxygen layer having a ratio of the number of A2 atoms to the number of oxygen atoms of 1:1 or less, the infinite layer structure comprising a Cu-oxygen layer stacked on a layer of A3, the Cu-oxygen layer having a ratio of the number of copper atoms to the number of oxygen atoms of 1:2.

6. The method according to claim 5, wherein said M is Cu, said A2 is Sr or Ba, said A3 is Ca, and n is 3 or 4.

7. The method according to claim 5, wherein said M is Cd, said A2 is Sr or Ba, said A3 is Ca, and n is 3 or 4.

8. The method according to claim 5, wherein an average valence of Cu ion is +2.05–+2.25.

9. An oxide superconductor comprising a composition of the formula:

$$(Pb_{1-x-y}M_x(A1)_y)(A2)_2(A3)_{n-1}(Cu)_n(O)_{2n+3+z}$$

wherein $0 \leq x \leq 0.6$,
$0 \leq y \leq 0.6$,
$x+y \leq 0.6$, n is an integer of 3 or 4, $-0.6 \leq z \leq 0.5$, M is Cd and x is defined as follows: $0.1 \leq x \leq 0.6$, A1, A2 and A3 are each independently one element selected from the group consisting of Ba, Sr and Ca, the oxide superconductor having a crystal structure comprising stacked layers in the following order: a first rock salt structure portion, an infinite layer structure stacked on the first rock salt structure portion and a second rock salt structure portion stacked on the infinite layer structure, the first rock salt structure portion and the second rock salt structure portion each comprising a (Pb, M, A1)-oxygen layer stacked on an A2-oxygen layer, said (Pb, M, A1)-oxygen layer having a ratio of the total number of atoms of Pb, M and A1 to the number of oxygen atoms of 1:0.5 to 1.5, said A2-oxygen layer having a ratio of the number of A2 atoms to the number of oxygen atoms of 1:1 or less, the infinite layer structure comprising a Cu-oxygen layer stacked on a layer of A3, the Cu-oxygen layer having a ratio of the number of copper atoms to the number of oxygen atoms of 1:2.

10. The oxide superconductor according to claim 1, wherein the oxide superconductor has a formula selected from the group consisting of $(Pb_{0.5}Cu_{0.5})Sr_2Ca_2Cu_3O_{9+z}$,
$(Pb_{0.8}Cu_{0.2})Sr_2Ca_2Cu_3O_{9+z}$,
$(Pb_{0.5}Cu_{0.4}Sr_{0.1})Sr_2Ca_2Cu_3O_{9+z}$,
$(Pb_{0.5}Cu_{0.25}Sr_{0.25})Sr_2Ca_2Cu_3O_{9+z}$,
$(Pb_{0.5}Cu_{0.1}Sr_{0.4})Sr_2Ca_2Cu_3O_{9+z}$,
$(Pb_{0.5}Cu_{0.25}Ca_{0.25})Sr_2Ca_2Cu_3O_{9+z}$,
$(Pb_{0.5}Ba_{0.5})Sr_2Ca_2Cu_3O_{9+z}$,
$(Pb_{0.5}Cu_{0.25}Ba_{0.25})Sr_2Ca_2Cu_3O_{9+z}$,
$(Pb_{0.5}Cu_{0.5})Ba_2Ca_2Cu_3O_{9+z}$,
$(Pb_{0.8}Cu_{0.2})Ba_2Ca_2Cu_3O_{9+z}$,
$(Pb_{0.5}Sr_{0.5})Ba_2Ca_2Cu_3O_{9+z}$,
$(Pb_{0.5}Cu_{0.25}Sr_{0.25})Ba_2Ca_2Cu_3O_{9+z}$,
$(Pb_{0.5}Cu_{0.5})Ba_2Ca_2Cu_3O_{9+z}$,
$(Pb_{0.5}Cu_{0.25}Ca_{0.25})Ba_2Ca_2Cu_3O_{9+z}$,
$(Pb_{0.5}Ba_{0.5})Ba_2Ca_2Cu_3O_{9+z}$,
$(Pb_{0.5}Cu_{0.25}Ba_{0.25})Ba_2Ca_2Cu_3O_{9+z}$,
$(Pb_{0.5}Cu_{0.5})(SrBa)_2Ca_2Cu_3O_{9+z}$,
$(Pb_{0.5}Cu_{0.5})(SrBa)_2Ca_2Cu_3O_{9+z}$,
$(Pb_{0.5}Cu_{0.5})(SrBa)_2Ca_2Cu_3O_{3-z}$,
$(Pb_{0.5}Cu_{0.5})Sr_2Ca_3Cu_4O_{11+z}$,
$(Pb_{0.5}Cu_{0.5})Ba_2Ca_3Cu_4O_{11+z}$,
$(Pb_{0.5}Cd_{0.5})Sr_2Ca_2Cu_3O_{9+z}$,
$(Pb_{0.5}Cd_{0.4}Sr_{0.1})Sr_2Ca_2Cu_3O_{9+z}$,
$(Pb_{0.5}Cd_{0.25}Sr_{0.25})Sr_2Ca_2Cu_3O_{9+z}$,
$(Pb_{0.5}Cd_{0.1}Sr_{0.4})Sr_2Ca_2Cu_3O_{9+z}$,
$(Pb_{0.5}Cd_{0.25}Ca_{0.25})Sr_2Ca_2Cu_3O_{9+z}$,
$(Pb_{0.5}Cd_{0.25}Ba_{0.25})Sr_2Ca_2Cu_3O_{9+z}$,
$(Pb_{0.5}Cd_{0.5})Ba_2Ca_2Cu_3O_{9+z}$,
$(Pb_{0.5}Cd_{0.2})Ba_2Ca_2Cu_3O_{9+z}$,
$(Pb_{0.5}Cd_{0.25}Sr_{0.25})Ba_2Ca_2Cu_3O_{9+z}$,
$(Pb_{0.5}Cd_{0.25}Ba_{0.25})Ba_2Ca_2Cu_3O_{9+z}$,
$(Pb_{0.5}Cd_{0.5})(SrBa)_2Ca_2Cu_3O_{9+z}$,
$(Pb_{0.5}Cd_{0.5})Sr_2Ca_3Cu_4O_{11+z}$ and
$(Pb_{0.5}Cd_{0.5})Ba_2Ca_3Cu_4O_{11+z}$.

11. The oxide superconductor according to claim 1, wherein the oxide superconductor does not contain a rare earth element.

12. The oxide superconductor according to claim 11, wherein the oxide superconductor does not contain Tl or Hg.

13. The oxide superconductor according to claim 1, wherein the oxide superconductor has a critical temperature of 100K or more.

14. The method according to claim 5, wherein M is Cd and x is defined as follows: $0.1 \leq x \leq 0.6$.

15. The method according to claim 5, wherein the pressure is 5 GPa.

16. The method according to claim 5, wherein the temperature is 900° C.

* * * * *